M. R. HUTCHISON.
SAFETY DEVICE FOR SECONDARY CELLS.
APPLICATION FILED JUNE 21, 1911.
1,116,893.
Patented Nov. 10, 1914.
2 SHEETS—SHEET 1.
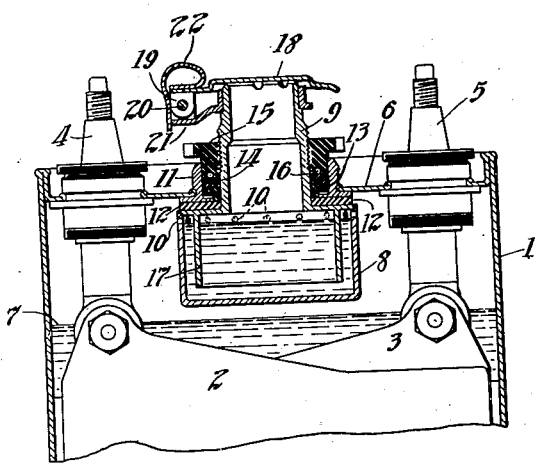
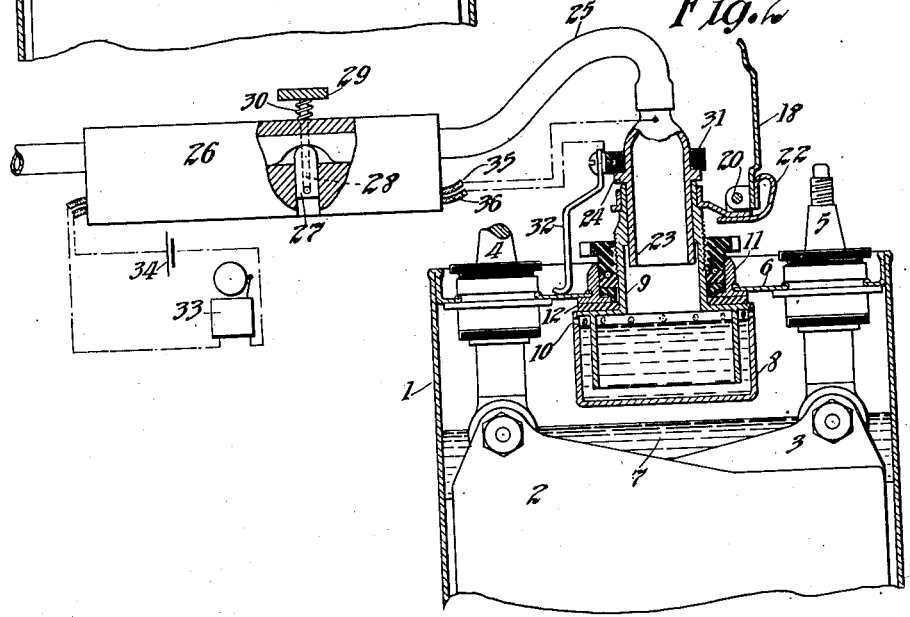
Witnesses:
Inventor:
Miller Reese Hutchison
by Frank L. Dyer
his Atty.

M. R. HUTCHISON.
SAFETY DEVICE FOR SECONDARY CELLS.
APPLICATION FILED JUNE 21, 1911.
1,116,893.
Patented Nov. 10, 1914.
2 SHEETS—SHEET 2.
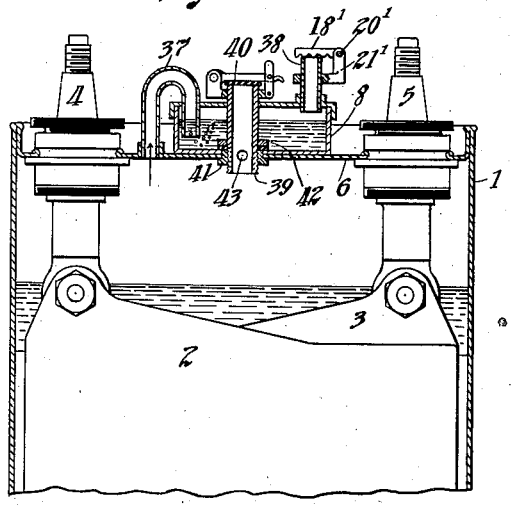
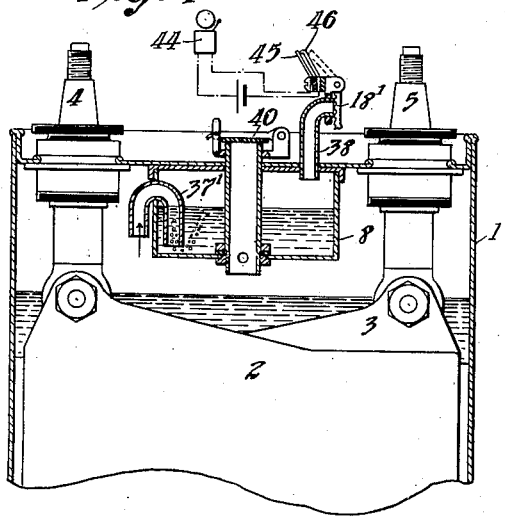
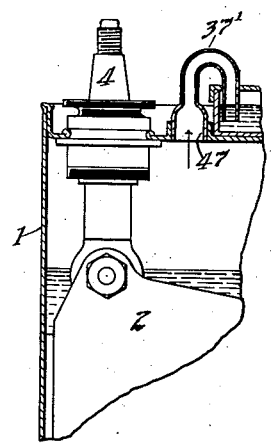
Witnesses:
Inventor:
Miller Reese Hutchison
by Frank L. Dyer
his Atty.

UNITED STATES PATENT OFFICE.

MILLER REESE HUTCHISON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

SAFETY DEVICE FOR SECONDARY CELLS.

1,116,893.   Specification of Letters Patent.   Patented Nov. 10, 1914.

Application filed June 21, 1911. Serial No. 634,429.

*To all whom it may concern:*

Be it known that I, MILLER REESE HUTCHISON, a citizen of the United States, and a resident of West Orange, county of Essex, and State of New Jersey, have invented certain new and useful Improvements in Safety Devices for Secondary Cells, of which the following is a description.

My invention relates to a combined separator, electrolyte replenisher and flame extinguisher for secondary cells.

It is designed to prevent harmful results from the explosion of gases within secondary cells, the depletion of the electrolyte, the deposit of chemical substances on the outside of the cells, the liability of a short circuit between the cells and generally to make the operation of a cell or a battery of cells more efficient and safer in various installations, particular attention being given to the case of an installation of a battery in a sub-marine vessel.

Accordingly, my object is to provide in combination with a battery cell or cells, simple and improved means for obtaining the results referred to, which are readily attached to or combined with cells of the present commercial form.

My invention comprises parts and combinations for carrying out these objects and also certain auxiliary devices for indicating or signaling various conditions in connection with the operation of the battery, all as will be described in the following specification and particularly pointed out in the accompanying claims.

When a storage or reversible cell is charged, the water in the electrolyte is decomposed, forming hydrogen and oxygen. In the Edison cell, this decomposition does not deplete the electrolyte of water to any great extent until over-charging takes place. It is necessary to keep the plates of such cells, be they of the lead or of the alkaline type, covered by electrolyte. Owing to depletion by charging, spilling out by careless handling, or the leaking of containing jars or cans, it becomes necessary frequently to replenish the electrolyte or at least keep the battery under close surveillance.

As hydrogen and oxygen are formed in the charging process an explosive mixture of the same collects in the space above the surface of the electrolyte and below the top of the containing can of a battery cell. If the tops of the plates or electrodes of the battery are allowed to become uncovered by the electrolyte and this depletion of the electrolyte continues until the active material on the grids is exposed to the oxygen present, rapid oxidation takes place as the exposed part becomes dry, with resultant heat. When the plates of the cell have become exposed as stated, explosions of the gases contained within the cell often take place either as the result of the heat caused by oxidation or by heat caused by some local action.

If the battery of cells is in an open and ventilated space, explosion in one cell is limited, in effect, to that cell. If the battery is inclosed, however, and one cell explodes, with the escape of the explosive mixture and the flame thereof into the inclosure, the entire tank and all the other cells will be liable to a sympathetic detonation. So, for example, when a storage battery is installed in a sub-marine boat the inclosing tank is made as air tight as possible at every point except that at which air is drawn into the tank over the tops of the cells and the point a which the air is expelled from the tank through ducts within which exhaust fans may be operated. The large amount of air thus drawn into the tank tends to prevent the liability of explosion, but, if the fans stop or are not started soon enough, a costly explosion may result. Furthermore, the gases in such a tank may be exploded without having been set off by the internal explosion of a cell. Placed as they must be within a limited space there is a considerable difference of potential between the end cells of two rows connected in series and the necessarily small distance between these cells renders the liability of the passage of a spark very probable. As long as the gases are kept dry and no sulfuric acid or potash is allowed to deposit upon the separators between the cells and become dry, this danger can very well be taken care of. When such a deposit is formed, however, the danger is greater. This is so, in the case of an alkaline cell, because while dry potash is not a conductor, still if it is deposited wet and then slowly dried, one line across the path of current flowing through the wet deposit is apt to dry first causing on open circuit with resultant spark.

The deposit of sulfuric acid in the case of lead cells and caustic potash in the case of cells of the Edison type on the tops of the jars or cans is caused by small particles of the same adhering to the surface of the gas bubbles that escape from the cell through the vent. When these bubbles burst the acid or potash deposits. Aside from the trouble caused by this deposit the action depletes the electrolyte and necessitates, in the lead cell, constant surveillance of the specific gravity of the cell; in the Edison type it occasions renewal of the electrolyte about once a year.

My invention is intended to overcome all objections above outlined in a practical and simple manner.

In order that a clearer understanding of my invention may be had, attention is hereby directed to the accompanying drawings, forming part of the specification and illustrating several of the various possible embodiments thereof.

In the drawings, Figure 1 represents a vertical cross section through an Edison cell equipped with one form of my invention; Fig. 2 is a similar view showing the cell being filled, a signaling device being illustrated to indicate when the cell has been filled sufficiently; and Figs. 3, 4 and 5 are vertical sections through a cell provided with modified forms of my invention, the cells being shown broken away in all cases.

Referring to the drawings, the cell 1 is represented as provided with plates 2 and 3 mounted in the usual manner and connected, all of the plates of one polarity with the terminal 4 and all the plates of the other polarity with the terminal 5, which extend through suitable bushings above the top 6 of the can. The electrolyte within the can is indicated by 7.

In the form of my invention illustrated in Figs. 1 and 2, I mount a vessel 8 within the can above the surface of the electrolyte and below the top of the can. This vessel is provided with a hollow cylindrical neck 9 which fits closely within the filling opening of the can. Otherwise the vessel is closed except for a series of holes 10 which are formed through the upper surface of the body of the vessel, preferably in the same horizontal plane, and connect the interior of the vessel with the space above the electrolyte in the cell.

The vessel 8 may conveniently be mounted in the filling opening of the can 1 as illustrated in Fig. 1, by mounting a flanged sleeve 11 of inverted T shape in the filling opening, the top of the can at the edge of the opening being crimped to hold the same, the flange of the sleeve being below the top of the can. The vessel 8 is placed within the opening with a hard rubber gasket 12 interposed between the top of the body of the vessel and the bottom of the flange of sleeve 11, a hard rubber gasket 13 being placed around the neck of the vessel and extending above the inner flange of sleeve 11 and between the same and the neck. A soft rubber gasket 14 is placed upon gasket 13 and a hard rubber gasket 15 having a screw threaded bore is mounted upon the neck 9 of the vessel 8, the neck having a screw threaded periphery, and this last named gasket is then screwed down into position between the neck of the vessel and the sleeve 11, a wire 16 being interposed between the gasket 15 and the soft rubber washer 14 upon which it rests when tightened into position. By this means the vessel 8 may be securely fastened in position and is also perfectly insulated from the metallic can.

In the embodiment of my invention being described, an annular sleeve or flange 17 extends downwardly from the upper horizontal surface of the vessel to within a short distance of the bottom of the vessel, this flange being placed but a short distance from the outer shell of the vessel. The openings 10 which preferably are formed directly beneath the upper horizontal surface of the vessel thus open into the space between the outer shell and the flange 17. The vessel 8 can be filled with water, caustic potash solution or other desired fluid through the neck of the vessel until the fluid within the vessel has reached the level of the holes 10 when it will flow outwardly therethrough into the cell and raise the level of the electrolyte therein.

The neck 9 is provided with a weighted, counterbalanced or spring-pressed cover, the particular form shown in Figs. 1 and 2 being deemed a preferable construction by me. As there shown, the cover 18 has a lug 19 which is pivoted on the pin 20 to the bracket 21 mounted on the neck 9. A spring 22 is secured to the rear edge of the cover and is formed with a loop, the free end of the spring pressing against the rear edge of lug 19 and bracket 21 when the cover is closed, the effect of the spring being to hold the cover in that position. When the cover is opened as shown in Fig. 2, the free end of the spring slides around the bracket 21 and presses against the underside of the same so as to tend to hold the cover in open position. When the cover is again closed, the resistance of the spring in sliding upon the under-surface of bracket 21 must be overcome.

The function of the fluid within the vessel or separator 8 is to separate particles of the salt or acid of the electrolyte from the gases formed within the cell and also to cool the gases to such an extent as to extinguish flame and prevent the carrying of the explosion outside the cell. The cover 18 should have a corrugated surface on its underside, or the top of neck 9 should be grooved as is shown in Fig. 1, so as to allow the escape of a normal volume of gas passing through the separator. As gas is formed within the cell, it passes into the separator through the openings 10 provided it has the slight pressure necessary to overcome the head of fluid in the separator represented by the distance the sleeve 17 extends downwardly into the fluid. It passes downwardly from openings 10 between the outer shell of the separator and the flange 17 and bubbles up through the fluid on the inner side of the flange and escapes through neck 9, the caustic potash or sulfuric acid carried by the bubbles being washed off to a great extent by the fluid in the separator, so that the gas escaping through the neck 9 will be comparatively free from these chemicals with consequent absence of deposit upon the top of the can. Should an explosion occur within the cell, the flame, in passing through the liquid in the separator 8 will become cool and the warm gases pass out through the neck 9 at a harmless temperature. The force of the explosion will raise the cover 18 and throw it into the position shown in Fig. 2, whereby it can serve as an indicator of the fact of the explosion. The hydrogen and oxygen in the cell having become combined and formed into water by the explosion, the resultant vacuum will tend to draw some of the fluid contained in the separator through holes 10 into the cell. If it is necessary after the explosion to increase the amount of fluid in the separator or of the electrolyte in the cell, the same can be accomplished simply by filling the separator through the neck thereof and if desired, permitting some of the fluid to pass through holes 10 into the cell. As the caustic potash carried by the gas bubbles has been washed off within the separator, the same will be returned to the cell when the fluid of the separator flows through openings 10 into the cell, and is thereby saved.

The electrolyte in the cell should be maintained at a level sufficiently high to keep the plates covered, and at the same time the electrolyte should not be allowed, upon filling the can, to rise above the bottom of the vessel 8. In Fig. 2 of the drawings, I have shown a device for indicating or giving a signal when the electrolyte, upon the filling of the can, has risen to a sufficiently high level to properly cover the plates, which apparatus, used in connection with a battery cell equipped with my separator and electrolyte replenisher, is one of the features of my invention. In the embodiment of my invention shown in Figs. 1 and 2, the separator 8 is so designed that the bottom thereof marks the correct level to which the electrolyte should rise upon filling the can. To fill the latter, the cover 18 is raised and a metallic tube 23 is inserted within the metallic neck 9 of the separator, the tube 23 fitting closely therein and making electrical connection therewith, and preferably having a shoulder 24 thereon to rest upon the upper margin of tube 9 to form a seat for tube 23. A flexible tubing 25 connects with the metallic tube 23, and through this the solution can be introduced into the separator and thence through the holes 10 into the can. I have illustrated the tubing 25 as provided with a handle 26 having any suitable valve for controlling the flow of liquid through the tube 25, the device illustrated consisting of a plunger 27 actuated by a yoke 28 connected with a thumb piece 29. A spring 30 surrounds the yoke 28 between the thumb and the handle to keep the valve normally closed because of the pressure of plunger 27 upon the tube 25. The valve is opened by depressing the thumb piece. The valve described however, is merely illustrative and is not part of my invention.

A bushing 31 of hard rubber or other insulating material is mounted upon the tube 23 above the shoulder 24 and carries a conducting finger 32 the lower end of which rests upon and makes contact with the metallic top 6 of the can 1 when the tube 23 is pushed into position in the neck of the separator to fill the receptacle. A suitable indicating or signaling device, such as the electric bell 33 is connected in series with a small battery or other source of current 34, the opposite sides of the signaling device being connected by wires 35 and 36, respectively, with the metallic tube 23 and the finger 32. The bell circuit is normally open because of the insulation between the separator and the can, but when the conducting liquid within the can 1 rises into contact with the bottom of separator 8, the circuit is completed from the tube 23 to the separator and thence through the electrolyte to the can and finger 32 ringing the bell 33 and indicating that the filling of the cell is completed.

Other embodiments of my invention are illustrated in Figs. 3, 4 and 5, in which the separator or vessel 8 is not mounted within the filling opening of the cell. In Fig. 3, the vessel 8 is mounted upon the top of the can 1, and a tube 37 sealed into the top 6 of the cell, serves to conduct gases from the cell into the separator. Tube 37 rises above the top of the separator where it is formed with a bend and has a descending arm which extends downwardly through the top of the separator to within a short distance of the bottom of the same. The top of the separator is closed except for a short tube 38 mounted in its top and provided with a cover 18' pivoted at 20' to a bracket 21' secured to the tube. This cover is weighted as shown, or is spring pressed to hold it in its seated position and should be provided with a corrugated under-surface or other provision made for the escape of gases therefrom, as was explained in connection with the description of the device shown in Fig. 1.

The tube 39 extends through the separator and the top of the cell, affording a passageway from the outer air to the interior of the cell. The top of this tube is normally closed by a pivoted cover and locking device, represented as a whole by the reference character 40, this construction illustrating the standard filling bung cover of the Edison type of cell. Tube 39 is screwed into the bushing 41 secured to the top of the can and the bottom of the separator, the tube 39 having a flange 42 which is seated upon the gasket interposed between the bottom of the flange and the top of bushing 41, when tube 39 is screwed down into position, to seal the bottom of the separator. Tube 39 is provided with a lateral hole 43 extending through its walls, the ends of which hole are covered by the bushing 41 when the tube is screwed into position illustrated in the figure. When tube 39 is unscrewed however, hole 43 is uncovered and whatever liquid is contained within the separator 8 will flow therethrough into the cell 1.

As gas is given off by the cell it passes upwardly through tube 37 and enters the separator below the level of the liquid therein, provided it has the slight pressure necessary to work against the head of liquid equivalent to the difference between the height of the liquid in the separator and the bottom end of the descending arm of the tube. It is desirable in all the embodiments of my invention, to keep this head comparatively slight. Care should be taken to have the area of the projected cylinder, the diameter of which is that of the inner end of tube 37, and the length of which is the distance between the lower end of the tube, within the separator and the bottom of the separator, as great as the area of the bottom end of the tube within the separator. As the gas passes through the tube 37 and thence through the liquid within the separator, the caustic potash or other chemicals carried by the bubbles will be washed off to a great extent, and the washed gas pass out beneath the cover 18'. Should an explosion occur within the cell, the flame passing through the liquid in the separator will be cooled and the cover 18' will be thrown up to indicate the explosion. Immediately after the explosion, the hydrogen and oxygen in the cell having become combined and formed into water, the resultant vacuum will siphon the liquid from the separator to the cell, the liquid in the separator being of sufficient volume to raise the level of the electrolyte in the cell sufficiently to again cover the plates. The liquid in the separator can then be replenished by filling the same through tube 38.

To inspect the height of the electrolyte in the cell, cover 40 of tube 39 is raised and a depth gage inserted. If the level of the electrolyte is low tube 39 may be unscrewed until the opening 43 is uncovered permitting the liquid in the separator to flow into the cell to any desired extent. Therefore, the caustic potash or other chemical held in solution in the liquid in the separator again passes into the cell and is not lost. The tube 39 is then screwed down into position and its cover closed when the electrolyte has reached a sufficient level. If more than the volume of the liquid in the separator is required to be added to the electrolyte in the cell it can of course, be filled into the cell through the top of tube 39. The air necessary to permit the siphon action of tube 37 referred to, will enter the separator through the corrugations in the bottom of cover 18'. The gas of an explosion can likewise escape rapidly through the corrugations of cover 18', if the cover, for any reason, fails to open.

When the siphon action of tube 37 starts, as described, the liquid in the separator will be siphoned into the cell until the end of the tube 37 within the separator has become uncovered. This would permit the next explosion to pass through the separator without the cooling of the gases by the fluid in the separator, if the latter has not been refilled in the meantime. Accordingly I consider it desirable to form the siphon tube 37 with the outside end shorter than the inside end, whereby the siphon action will be stopped while a considerable head of liquid still remains above the inside end of the siphon. I have shown such a construction in Fig. 4 in which the separator 8 is mounted inside of the cell 1 being attached to the underside of the cover thereof, so that the tube 37' having the outside end shorter than the inside can be used as explained. In this figure I have also illustrated a device for causing an audible signal to be sounded when the cover 18' is thrown back denoting an explosion. Such a signal can be given in any desired manner. In Fig. 4, I have illustrated an electric bell 44 connected in series with a small battery or other source of electrical energy, the ends of the circuit being connected to contact springs 45 and 46 which normally are in open position. When the cover 18' is thrown by the force of explosion into its open position indicated in Fig. 4, by dotted lines, it forces spring 46 into contact with spring 45, completing the circuit and sounding the alarm. It will be evident that the covers 18 and 18' themselves constitute indicating or signaling devices when thrown into open position, and that they accordingly may be designated as indicating or signaling devices, as well as audible signals 33 and 44 described, or other suitable forms of indicating devices which might readily be devised to be operated by the opening of the covers. Bells or signals such as 33 and 44 may be located at a distant switch-board and upon sounding or giving an indication, the switch-board attendant can tell which cell needs replenishing.

It may be desirable in the case of large cells to interpose a baffle plate in the path of the bubbles conducted into the separator from the leading-in tube to prevent the tendency of the gas to escape in large bubbles which cannot be cooled quickly or to accomplish the same result in some other manner. It may be desirable to interpose an expansion chamber between the cell and the separator so that the burned gases may have a chance to expand somewhat before reaching the separator. Such a construction is illustrated in the modification of Fig. 5, in which tube 37' is provided with an enlarged lower end 47 sealed into the top of the cell and constituting an expansion chamber. The effect of baffling bubbles passing through the liquid in the separator referred to, is accomplished in the embodiment of my invention shown in Fig. 1 by the sleeve 17.

A battery of cells may be used connected in the usual manner and each one provided with a separator such as described. The arrangement effectually seals the cells from outside impurities, air, flame, etc., besides accomplishing the other functions of safety and economy already referred to.

Having now described my invention what I claim and desire to protect by Letters Patent is:—

1. In apparatus of the character described, the combination with a battery cell, of fluid-containing means for extinguishing the flame of an internal explosion in said cell, and means for indicating the occurrence of such explosion, comprising a member adapted to be displaced to operative position by passage of gas in excess of a predetermined pressure through said fluid-containing means, substantially as described.

2. In apparatus of the character described, the combination with a battery cell, of a fluid-containing vessel so connected with said cell as to cause the passage of gas therefrom into said vessel below the fluid-level of the same, and a pivoted cover for said vessel.

3. In apparatus of the character described, the combination with a battery cell, of a fluid-containing vessel so connected with said cell as to cause the passage of gas therefrom into said vessel below the fluid level of the same, and a movable cover for said vessel located and arranged to be moved into open position by excess of gas pressure within said vessel.

4. In apparatus of the character described, the combination with a battery cell, of a fluid-containing vessel so connected with said cell as to cause the passage of gas therefrom into said vessel below the fluid level of the same, a pivoted cover for said vessel, said cover being located and arranged to be moved into open position by excess of gas pressure within said vessel, and a spring so formed and positioned as to coact with said cover to resiliently hold the same in either closed or open position.

5. In apparatus of the character described, the combination with a battery cell, of a vessel fitting closely within the filling opening of the same and provided with an exterior opening and an opening extending from the interior thereof into the space above the electrolyte in the said cell and a removable cover for the exterior opening.

6. In apparatus of the character described, the combination with a battery cell, of a fluid-containing vessel mounted within the same, having a passage therefrom extending out through the top of the cell, said vessel having a vertical sleeve extending downwardly therein from an upper surface to a plane above the bottom of said vessel, said sleeve surrounding the lower end of said passage, and said vessel having circumferential openings connecting the space above the electrolyte in said cell with the interior of said vessel outside said sleeve and above the bottom of the same.

This specification signed and witnessed this 19th day of June 1911.

MILLER REESE HUTCHISON.

Witnesses:
HENRY LANAHAN,
ANNA R. KLEHM.